(12) United States Patent
Yang et al.

(10) Patent No.: US 6,445,520 B1
(45) Date of Patent: Sep. 3, 2002

(54) METHOD FOR DETECTING MECHANICAL DAMAGE IN A PARKING ZONE OF A HARD DISK DRIVE

(75) Inventors: Wonchoul Yang, San Jose; Kangseok Lee, Cupertino; Haesung Kwon, San Jose, all of CA (US)

(73) Assignee: Samsung Electronics Company (KR)

( * ) Notice: Subject to any disclaimer, the term of this patent is extended or adjusted under 35 U.S.C. 154(b) by 0 days.

(21) Appl. No.: 09/732,410

(22) Filed: Dec. 6, 2000

(51) Int. Cl.[7] ................................................ G11B 5/02
(52) U.S. Cl. .............................. 360/25; 360/53; 360/31
(58) Field of Search ............................... 360/25, 53, 75, 360/31; 324/212, 226

(56) References Cited

U.S. PATENT DOCUMENTS 5,838,514 A * 11/1998 Smith et al. ................... 360/75

OTHER PUBLICATIONS

"In–Situ Disk Durability Monitoring", IBM Technical Disclosure Bulletin, vol. 39, No. 6, Jun. 1996, p. 171.*

* cited by examiner

Primary Examiner—Alan T. Faber
(74) Attorney, Agent, or Firm—Irell & Manella, LLP; Jeffrey P. Aiello

(57) ABSTRACT

A method for detecting an asperity in a non-data parking zone of a disk in a hard disk drive. The method includes the steps of moving the heads of the disk drive adjacent to the parking zones of the disks, and then detecting asperities in the parking zones with a thermal asperity detection circuit.

18 Claims, 3 Drawing Sheets

METHOD FOR DETECTING MECHANICAL DAMAGE IN A PARKING ZONE OF A HARD DISK DRIVE

BACKGROUND OF THE INVENTION

1. Field of the Invention

The present invention relates to a method for detecting an asperity on a parking zone of a disk.

2. Background Information

Hard disk drives contain a plurality of heads that are coupled to a number of magnetic disks. The heads can read information by sensing the magnetic fields of the disks, and write information by varying the magnetic fields of the disks. Information is typically stored within data sectors that are located on annular tracks of the disks.

The heads are typically attached to an actuator arm and a voice coil motor. The voice coil motor can be energized to move the heads to different tracks of the disks.

Each read/write head has an air bearing surface that cooperates with an airflow generated by the rotating disk to create an air bearing between the head and the disks surface. The air bearing reduces mechanical wear between the head and the adjacent disk surface. It is desirable to design an optimum air bearing that will minimize mechanical wear while maximizing the magnetic coupling between the disk and the head.

Some heads contain a magneto-resistive (MR) material that is used to sense the magnetic field of the disks. The resistance of the magneto-resistive material will vary linearly with variations in the magnetic field. The magneto-resistive material is coupled to a current source. Variations in the magnetic field of the disk will cause a corresponding-change in the magneto-resistive resistance and the voltage sensed across the magneto-resistive element. MR heads typically have a higher bit density than other types of disk drive heads.

The disks may have one or more asperities that make physical contact with the heads. The asperity may be a particle that resides on the disk, or an irregularity in the disk surface. The contact between the asperity and the head may cause a momentary increase in temperature of the magneto-resistive material. The increase in temperature will increase the resistance and corresponding voltage sensed across the magneto-resistive element. There have been developed thermal asperity detection circuits that will detect and compensate for the variation in the read signal caused by contact between the head and an asperity.

During operation of the disk drive the heads are located adjacent to the data fields of the disks. When the disk drive is powered down the heads may be moved to parking zones of the disks. The parking zones are typically areas of the disks that have no data. The disk drive may be subject to shock and/or vibration loads that cause the heads to slap the disks. Head slapping may cause damage to the disks and/or heads. Placing the heads in non-data parking zones of the disks insure that data is not corrupted from a head slapping event.

The surfaces of the disks are typically inspected with a disk certifier before being assembled into a hard disk drive. The disk certifier may include optical elements that are used to detect the surfaces of the disks. The certifiers are used to detect and possibly correct defective disks.

Sometimes an asperity is formed after the disks have been inspected and assembled into a drive. For example, an asperity may be formed in the parking zone of a disk during the assembly process. The asperity may decrease the life and reliability of the disk drive. It would be desirable to detect an asperity in the parking zone of a disk after the disk drive has been assembled to screen for defective products before the drive is shipped to a customer.

BRIEF SUMMARY OF THE INVENTION

One embodiment of the present invention is a hard disk drive which has a controller that can move a head to a parking zone of a disk. The disk drive may include a thermal asperity detection circuit that is coupled to the head and can detect an asperity in the parking zone of the disk.

DETAILED DESCRIPTION OF THE PREFERRED EMBODIMENT

In general the present invention provides a method for detecting an asperity in a non-data parking zone of a disk in a hard disk drive. The method includes the steps of moving the heads of the disk drive adjacent to the parking zones of the disks, and then detecting asperities in the parking zones with a thermal asperity detection circuit.

Figure 1:
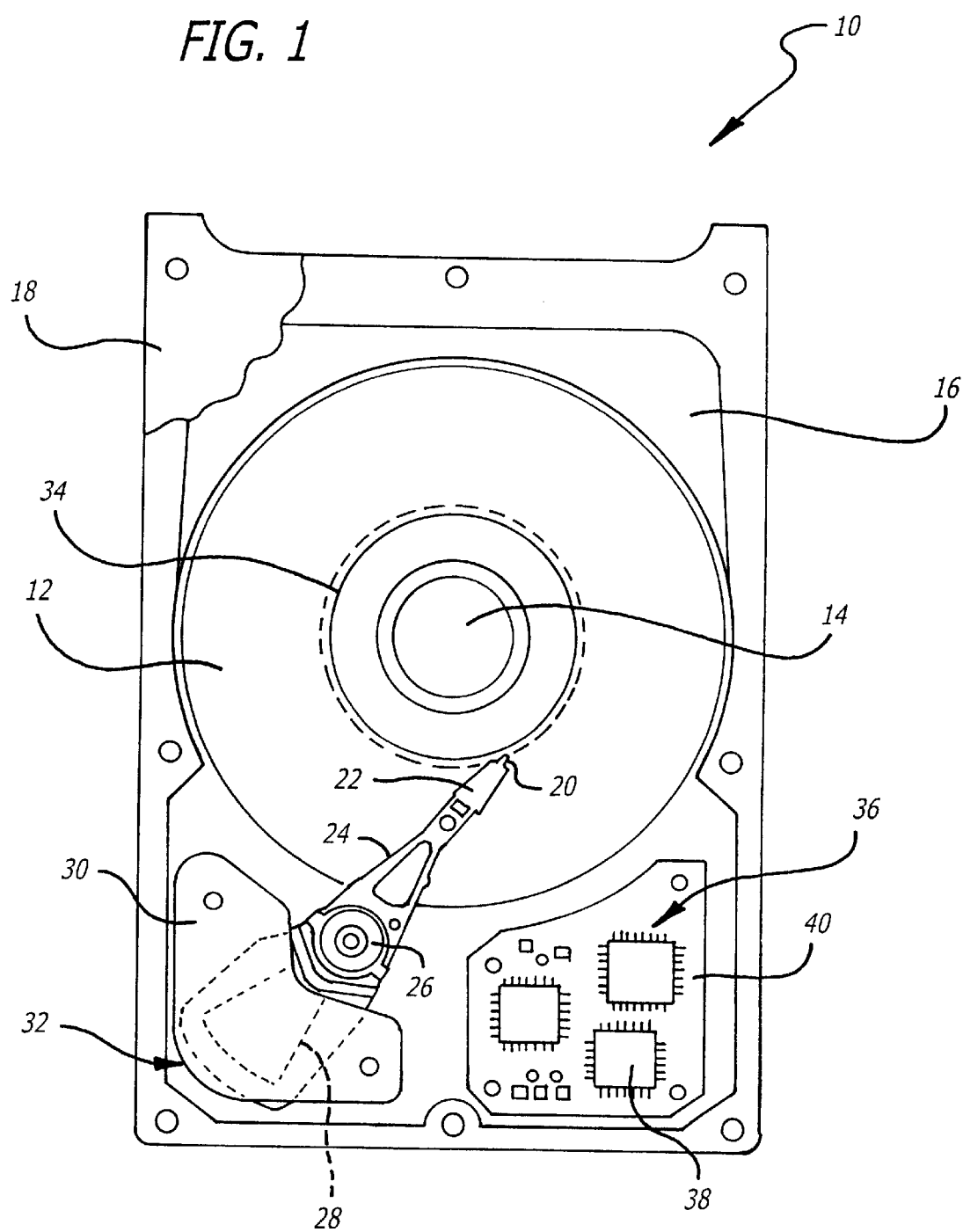
FIG. 1 is a top view of an embodiment of a hard disk drive of the present invention.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown) that magnetize and sense the magnetic fields of the disks 12. By way of example, the heads 20 may include magneto-resistive read elements.

Each head 20 may be gimbal mounted to a flexure arm 22 as part of a head gimbal assembly (HGA). The flexure arms 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

The voice coil motor 32 can move the heads 20 to a parking zone 34 of each disk 12. The parking zone 34 is an area that does not contain any data. The heads 20 are typically moved to the parking zones 20 when the disk drive 10 is powered down.

The hard disk drive 10 may include a printed circuit board assembly 36 that includes a plurality of integrated circuits 38 coupled to a printed circuit board 40. The printed circuit board 38 is coupled to the voice coil 28, heads 20 and spindle motor 14 by wires (not shown).

Figure 2:
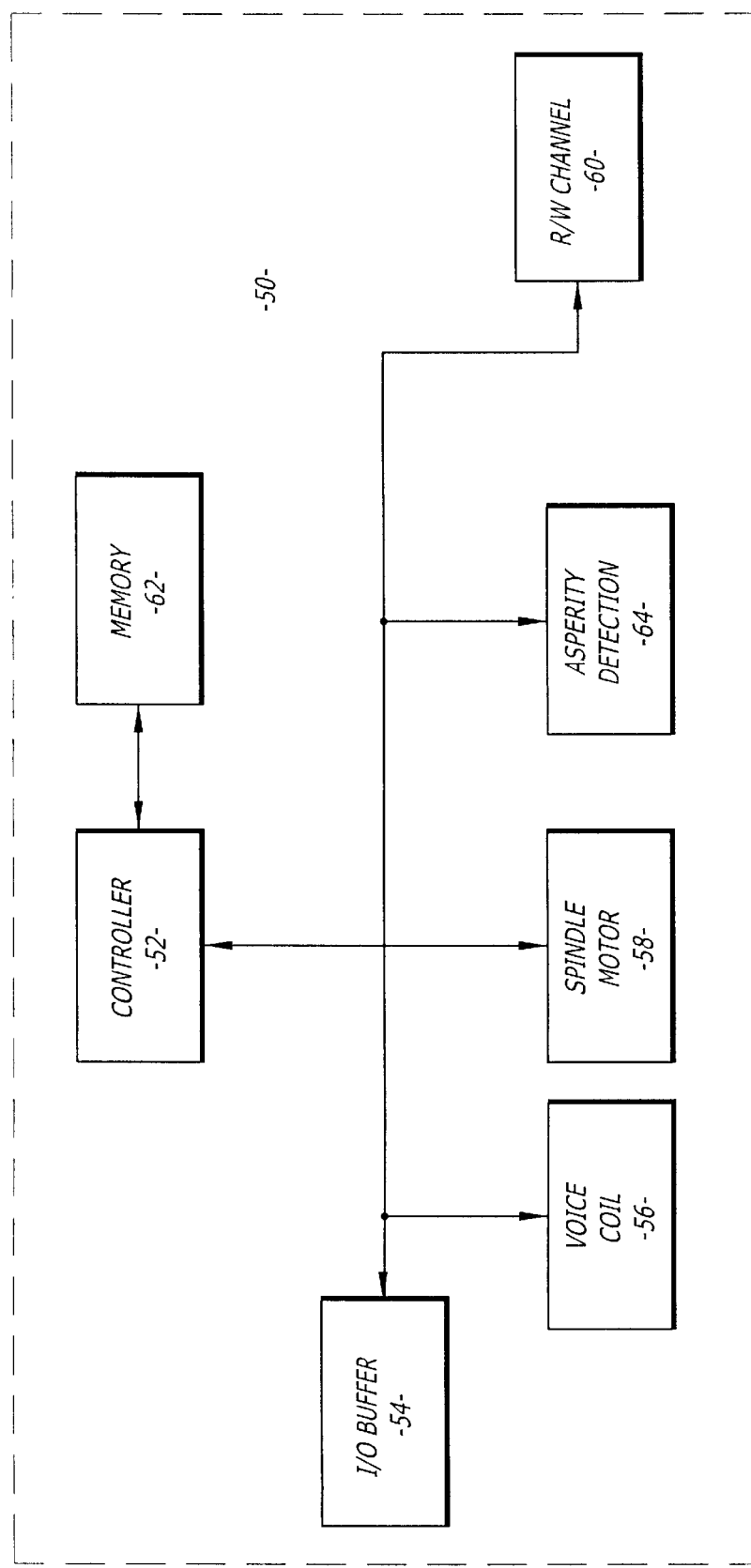
FIG. 2 is a schematic of an electrical system of the hard disk drive.

FIG. 2 shows a schematic of an electrical system 50 that can control the disk drive 10. The system 50 includes a controller 52 that is connected to an input/output (I/O) buffer 54, voice coil motor control circuit 56, spindle motor control circuit 58, read/write channel circuit 60, memory 62 and a thermal asperity detection circuit 64. The I/O buffer 54 provides an interface with an external source such as a personal computer. The voice coil control circuit 56 and spindle motor control circuit 58 contain drivers, etc. to control the voice coil motor and spindle motor, respectively. The voice coil motor circuit 56 and spindle motor control circuit 58 operate in accordance with signals, commands, etc. from the controller 52.

The controller 52 may be a processor that can perform software routines in accordance with instructions and data. Memory 62 may include both volatile and non-volatile memory. The thermal asperity circuit 64 can detect an asperity on the disks 12. The thermal asperity circuit 64 can provide an output signal, command, etc. to the controller 52 when an asperity is detected. Additionally, the thermal asperity circuit 64 may provide the output signal, command, etc. to the I/O buffer 54 for transmission to an external device such as a test station.

Figure 3:
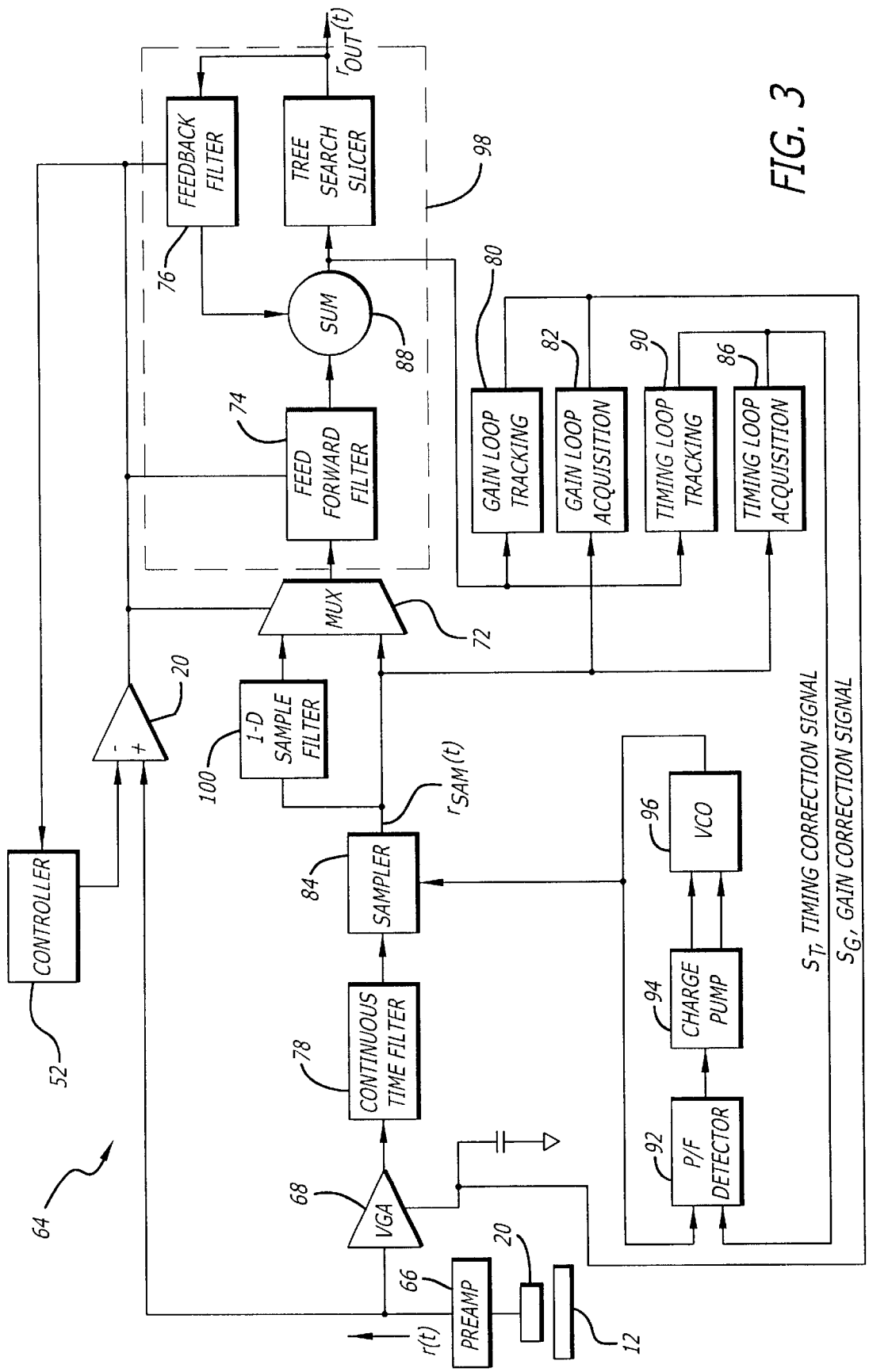
FIG. 3 is a schematic of a thermal asperity detection circuit of the electrical system.

FIG. 3 shows an embodiment of a thermal asperity circuit 64 of the present invention. The thermal asperity compensation circuit 64 includes a preamplifier 66 that is coupled to one of the heads 20. When reading data the head 20 generates a read signal that corresponds to the magnetic field of the disk 12. The read signal is first amplified by the preamplifier 66, and then provided to a variable gain amplifier (VGA) 68. The amplified read signal is also provided as one input to the noninverting terminal of a threshold detector 70. The inverting terminal of the threshold detector 70 is coupled to a threshold signal which is representative of a typical level of a thermal asperity. The threshold signal may be provided by the controller 52. The output of the threshold detector 70 is used to control a multiplexor 72, a feedforward filter 74 and a feedback filter 76, as described in detail in the following sections.

The VGA 68 amplifies the read signal that is then provided to a continuous time filter 78. The output of the VGA 68 is a function of a gain correction signal SG of a gain tracking loop 80 and a gain loop acquisition loop 82. In one embodiment, the continuous time filter 78 is a 7-pole, 2-zero equi-ripple filter for standard signal conditioning, as is known in the art. In particular, the continuous time filter 78 limits the received signal's bandwidth to prevent aliasing. As such, the continuous time filter 78 is a low pass filter with a cut-off frequency that is less than half the sampling rate of sampler 84. Continuous time filter 78 may also provide some equalization of the analog signal. The output of the continuous time filter 78 is provided to a sampler 84, which samples the amplified read signal to provide a sequence of analog samples RSAM of the amplified read signal.

Samples $r_{SAM}$ of the amplified read signal are also provided to the gain loop acquisition circuit 82 and a timing loop acquisition circuit 86. The output of the summing circuit 88 is provided to the gain loop tracking circuit 80 and a timing loop tracking circuit 90. A gain correction signal $S_G$ generated by the gain loop tracking circuit 80 and the gain loop acquisition circuit 82, is provided as a variable gain set point for the VGA 68. The timing correction signal ST generated by the timing loop tracking circuit 90 and the timing loop acquisition circuit 86, which provides timing corrections to the sampling rate, is provided to a phase/frequency detector 92. Phase and frequency errors are provided to a charge pump 94 which accumulates a charge proportional to the timing correction signal $S_T$. In response, the charge pump 94 outputs the accumulated charge due to timing error as a voltage to a voltage controlled oscillator (VCO) 96. The VCO 96 generates a signal with a corrected frequency which is used to control the sampling frequency of the sampler 84, and which is simultaneously fed back to the phase/frequency detector 92 for comparison with the timing correction signal $S_T$ generated by the timing loop tracking circuit 90.

During normal operation, the output of the sampler 84 is directly provided to a FDTS detector 98 via multiplexor 72. The feedforward filter 74 and the feedback filter 76 in the FDTS detector 98 will also utilize a first set of predetermined parameters (such as taps) for normal operation. However, when a thermal asperity is detected by threshold detector 70, the threshold detector 70 generates a signal to select the multiplexor 72 to multiplex the samples $r_{TA}(t)_{SAM}$ from a 1-D sample filter 100, to the FDTS detector 98. The 1-D sample filter 100 first differentiates the sample stream and then removes the level shift from the resulting sample stream. In one embodiment, the sample filter 100 is a discrete time filter having a transfer function of T(D)=1-D, where D is a delay factor. Depending upon system partial response parameters, D may be vary from $D^2$ to $D^N$, where N is an integer. When a thermal asperity is encountered, the multiplexor 72 also provides a signal to the feedforward filter 74 and the feedback filter 76 in the FDTS detector 98, to utilize a second set of predetermined parameters (such as taps) for processing the read signal. Samples from the FDTS detector 98 are then generated as output signal $r_{OUT}(t)$. The threshold detector 100 also provides an output that is provided to the controller 52. The circuit shown in FIG. 3 is also disclosed in U.S. Pat. No. 6,094,316, which is assigned to the same assignee, and is hereby incorporated by reference.

Referring to FIGS. 1–3, in operation, the disks 12 are rotated by the spindle motor 14 and the controller 52 may establish a threshold parameter for the threshold detector 70. The controller 52 may then generate signals, commands, etc. to move the heads 20 to the parking zones 34 of the disks 12. The heads 20 may fly for a predetermined time interval to insure that the system is stable. For example, the heads may fly in the parking zone for 5 minutes. An asperity on the disks 20 may cause a variation in the sensing voltage of the head 20 to exceed the threshold value provided to the threshold detector 70. The threshold detector 70 then provides an output to the controller 52. The controller 52 may have the detection stored in memory 62 and/or provided to the I/O buffer 54 for transmission to an external source such as a test station.

The controller 52 can further generate signals, commands, etc. to incrementally move the heads 20 across the parking zones in accordance with a seek routine. The thermal asperity circuit 64 can detect asperities as the heads 20 are incrementally moved across the parking zones. Both the presence of an asperity and the location of the asperity may be stored in memory 62 and/or provided to the I/O buffer 54.

The present invention thus provides a technique to detect asperities in the parking zones of the disks 20 assembled within a disk drive without significantly changing the disk drive 10.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:

a disk that has a parking zone;

a spindle motor that rotates said disk;

a head that is coupled to said disk;

an actuator arm that is coupled to said head;

a voice coil motor that is coupled to said actuator arm and can be activated to move said head relative to said disk;

a thermal asperity detection circuit that is coupled to said head and can detect an asperity on said disk;

a controller that is coupled to said voice coil motor and said thermal asperity detection circuit, said controller causes said voice coil motor to move said head into and across said entire parking zone so that said thermal asperity detection circuit can detect an asperity in the parking zone.

2. The disk drive of claim 1, wherein said controller causes said voice coil motor to move said head across said parking zone in accordance with a seek routine.

3. The disk drive of claim 1, wherein a detection of an asperity is stored in memory.

4. The disk drive of claim 3, wherein a location of an asperity is stored in memory.

5. The disk drive of claim 1, wherein said thermal asperity detection circuit includes a threshold detector.

6. The disk drive of claim 5, wherein said thermal asperity detection circuit includes a compensation circuit.

7. The disk drive of claim 1, wherein said head includes a magneto-resistive read element.

8. A method for detecting an asperity in a parking zone of a disk located within a hard disk drive, comprising:

rotating a disk that has a parking zone;

moving a head to the parking zone, said head providing a signal; and detecting an asperity in the parking zone from the signal provided by the head while moving the head across the entire parking zone.

9. The method of claim 8, wherein the signal is compared with a threshold value to determine the asperity.

10. The method of claim 8, wherein the head is moved across the parking zone in accordance with a seek routine.

11. The method of claim 10, wherein the detection of the asperity is stored in memory.

12. The disk drive of claim 11, wherein a location of the asperity is stored in memory.

13. A circuit for a hard disk drive that has a head which is coupled to a disk, the disk has a parking zone, the head provides a signal, comprising:

a controller that can move the head to and across the entire parking zone of the disk; and, a thermal asperity detection circuit that receives the signal from the head and can detect an asperity in the parking zone.

14. The circuit of claim 13, wherein said controller causes the head to move across the parking zone in accordance with a seek routine.

15. The circuit of claim 13, wherein the detection of the asperity is stored in memory.

16. The circuit of claim 15, wherein a location of the asperity is stored in memory.

17. The circuit of claim 13, wherein said thermal asperity detection circuit includes a threshold detector.

18. The circuit of claim 17, wherein said thermal asperity detection circuit includes a compensation circuit.

* * * * *